Oct. 23, 1945.  A. ZELLOS  2,387,486
BELLOWS
Filed Aug. 15, 1944

INVENTOR.
ANDREW ZELLOS
BY Victor J. Evans & Co.
ATTORNEYS

Patented Oct. 23, 1945

2,387,486

UNITED STATES PATENT OFFICE 2,387,486

BELLOWS

Andrew Zellos, Ossining, N. Y.

Application August 15, 1944, Serial No. 549,596

2 Claims. (Cl. 137—156.5)

My present invention in its broadest aspect has to do with improvements in bellows which may be used to advantage in ice plants to pump ammonia and the like, although I do not wish to be so limited since my bellows may be embodied in pumps without regard to the number of cylinders and whenever it is desirable to eliminate friction, in cooling systems and the like. More particularly, it is my purpose to provide a unique bellows or diaphragm construction embodying screen mesh covered and incorporated in rubber or the like, and welded or otherwise connected at the joints to rings thereby to provide an especially sturdy, flexible, long wearing and practical device.

Other equally important objects and advantages will be apparent from the following description taken in connection with the drawing, but changes in form, size, shape, materials, and the construction, combination and arrangement of parts may be made without departing from the spirit and the scope of my invention as claimed.

In the drawing wherein I have illustrated a preferred embodiment of my invention:

In the drawing wherein like characters of reference are used to designate like or similar parts throughout the several views.

Figure 1:
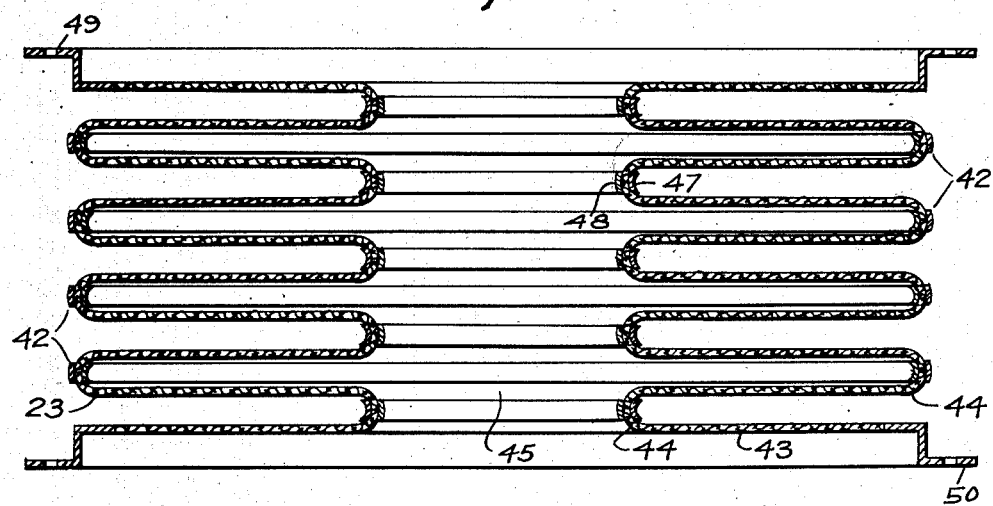
Figure 1 is a vertical section through one of my bellows or diaphragm assemblies.
Figure 2:
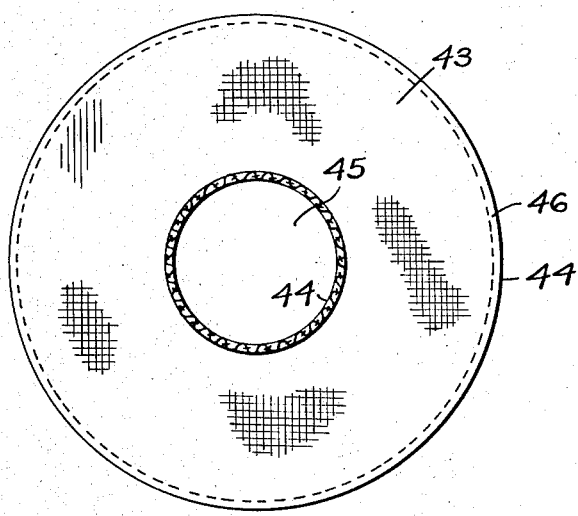
Figure 2 is a plan view of a diaphragm section.
Figure 3:
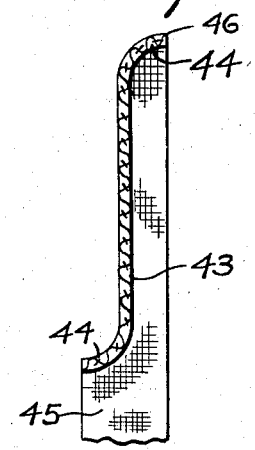
Figure 3 is a section through a diaphragm section.
Figure 4:
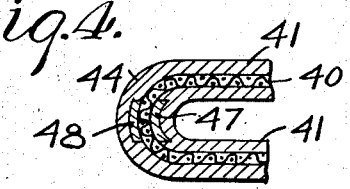
Figure 4 is a detail of the ring connections between the diaphragm sections.

The diaphragm assemblies or bellows 23 are formed of wire mesh 40 covered and coated with a rubber coating 41. Each section 42 of the bellows has a flat annular part 43 with oppositely curved or flanged edges 44, one adjacent the central opening 45 and one adjacent the periphery 46. An inner ring 47 and an outer ring 48, each of which is slightly curved in cross section—see Figure 4—is disposed over the meeting edges of the sections and electrically welded, or otherwise, connected thereto to form a tight connection when coated with rubber. The diaphragm assemblies or bellows 23 have upper and lower flanges 49 and 50 which are connected to plates 28. This construction affords an especially sturdy, leakproof bellows capable of long and strenuous service.

It is believed that the construction and advantages of my invention will be apparent from the foregoing, but it is again emphasized that interpretation of the scope of my invention should only be conclusive when made in the light of the subjoined claims.

I claim:

1. A bellows formed of wire mesh, each section formed of flat annular portions having curved meeting flanges, curved metal rings overlapping said inner and outer meeting edges and welded thereto, and said wire mesh and rings coated with rubber.

2. A bellows formed of wire mesh, each section formed of flat annular portions having curved meeting flanges, curved metal rings overlapping said inner and outer meeting edges and welded together, metal flanges secured to the upper and lower mesh assembly, and the mesh and rings coated with rubber.

ANDREW ZELLOS.